(12) United States Patent
Trueblood et al.

(10) Patent No.: US 6,228,314 B1
(45) Date of Patent: May 8, 2001

(54) MULTIPLE-PASS IRRADIATION OF POLYOLEFIN FILMS

(75) Inventors: Ricky L. Trueblood, Bettendorf; Grant Franklin Parrish, Davenport; Joseph E. Kotwis, Clinton, all of IA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/317,101

(22) Filed: May 21, 1999

Related U.S. Application Data (60) Provisional application No. 60/086,578, filed on May 22, 1998.

(51) Int. Cl.[7] .............................. B29C 35/10; B29C 71/04
(52) U.S. Cl. ........................ 264/485; 264/495; 425/174.4
(58) Field of Search ...................................... 264/485, 495; 425/174.4

(56) References Cited

U.S. PATENT DOCUMENTS

| | | |
|---|---|---|
| 3,126,680 | 3/1964 | Baird, Jr. et al. . |
| 3,564,238 | 2/1971 | Martin et al. . |
| 3,657,533 | 4/1972 | Spillers . |

FOREIGN PATENT DOCUMENTS

| | | |
|---|---|---|
| 3844232 | 7/1989 | (DE) . |
| 0 012 330 | 6/1980 | (EP) . |
| 0 333 492 | 9/1989 | (EP) . |

OTHER PUBLICATIONS

James H. Bly, Electron Beam Processing, *Electron Beam Processing*, 106–107, 1988.
PCT International Search Report, International application No. PCT/US99/11415, dated Sep. 27, 1999.

*Primary Examiner*—Leo B. Tentoni (57) ABSTRACT

The invention provides a process and apparatus for crosslinking a polymer film at a level of 500 kV or less. The distance between the emissions window of an irradiation means, e.g. a self-shielded electron beam processor, and first pass film, as well as between additional passes, is no more than 5 inches, preferably no more than 3 inches, and more preferably no more than 2 inches. The polymeric film is preferably a polyolefin, having a thickness ranging from about 0.00016 inches to about 0.007 inches. The film speed preferably ranges from about 500 ft/min to about 2000 ft/min.

22 Claims, 4 Drawing Sheets

MULTIPLE-PASS IRRADIATION OF POLYOLEFIN FILMS

This application claims the benefit of U.S. Provisional Application No. 60/086,578 filed May 22, 1998, now pending.

FIELD OF THE INVENTION

This invention relates to an apparatus and process for crosslinking a polymer film. This invention specifically relates to an apparatus for irradiating a polymer film at a level of 500 kV or less wherein the polymer film is treated in two or more passes.

BACKGROUND OF THE INVENTION

The making of polyolefin packaging films is well-known and includes the techniques of casting films as thin sheets through narrow slit dies, and the blownfilm techniques wherein an extruded tube of molten polymer is inflated to the desired "bubble" diameter and/or film thickness. In an exemplary process, the resins and additives are introduced into an extruder where the resins are melt plastified by heating and then transferred to an extrusion die for formation into a film tube. When desired, films may then be crosslinked by various means, with electron beam crosslinking preferred.

In an electron beam processor (EBP), electrons are generated and accelerated in a vacuum then emitted to irradiate an object with electrons. The electron beam processor is used in various applications including curing of coatings and inks, irradiation of foodstuff, sterilization of medical products, as well as crosslinking and grafting of polymeric materials.

An electron beam processor typically comprises: a) a power supply, b) an electron emitter, e.g. a heated cathode, c) an accelerator for shaping the emitted particles into a beam and for directing and accelerating the energized particle beam towards an emissions window, d) a vacuum chamber from which air molecules are removed so air cannot interfere with the generation of the particle beam, e) a support structure which provides a method to seal the vacuum chamber, f) an emissions window, g) a product treatment area where the object being irradiated passes through, and h) an emission collector plate. Electron beam energy is expressed by the acceleration voltage, which is typically in the range of 100 kV to 10,000 kV. A polyethylene crosslinking application typically runs at high energy levels with typical voltages over 500 kV.

The use of multi-pass irradiation to treat polymer films is generally known. Typically this is done by passing the film over a series of rollers and irradiating at a high voltage. U.S. Pat. No. 3,126,680, Baird, Jr. et al, discloses such a process, indicating that the voltage should be high, 750 kV or higher, preferably at least 1000 kV. Though this method may be preferred for irradiating polymer films, the electrons must pass through not only two or more thicknesses of the film, but also through the intervening air spaces. This typically has not been an impediment provided the voltage of the machine, or the energy of the electrons, is high enough. (James H. Bly, *Electron Beam Processing*, 106–107 (1988).)

Multi-pass irradiation of polymer films at low voltages requires special considerations. Applicants have designed an apparatus and process to overcome the problems of low voltage, multi-pass irradiation.

SUMMARY OF THE INVENTION

The invention, accordingly, resides in an apparatus for crosslinking a polymer film comprising:

a. a means for irradiating the polymer film at a level of 500 kV or less, such means having an emissions window;

b. a first means for passing the polymer film adjacent to the emissions window for a first-pass film irradiation treatment, wherein the distance between the emissions window and the first-pass film defines a first air gap; and     c. a second and n additional means for passing the polymer film adjacent to the first pass film and opposite the emissions window for a second-pass and n additional-pass film irradiation treatments, where $n \geq 0$;

wherein the polymer film may travel either in a direction from the first means to the second means for passing the polymer film, or in the reverse direction, and         wherein the distance between the first-pass film and the second-pass film defines a second air gap, and each distance between each additional pass and the previous pass thereafter defines a corresponding air gap, each of the air gaps being no more than about 5 inches.

Furthermore, the invention also provides an improved process for crosslinking a polymer film comprising treating the polymer film with electron irradiation to cause crosslinking, wherein the improvement comprises irradiating the polymer film at a level of 500 kV or less, in at least two steps, comprising     (a) passing the polymer film adjacent to an emissions window of an electron irradiation means, wherein the distance between the emissions window and the film defines a first air gap; and     (b) passing the film adjacent to the film pass of step (a) and opposite the emissions window for a second treatment of the film, wherein the distance between the film pass of step (a) and the film pass of step (b) defines a second air gap; and optionally     (c) passing the film adjacent to the film pass of step (b) and opposite the emissions window for additional pass treatments of the film, wherein the distance between each additional pass and the previous pass defines a corresponding air gap,         such that each air gap is no more than about 5 inches.

Steps (a) and (b) of the process may be reversed such that the film initially passes adjacent to the second air gap, and subsequently passes adjacent to the emissions window and first air gap.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and together with the description serve to explain the principles of the invention.

DETAILED DESCRIPTION OF THE INVENTION

In accordance with the present invention there is provided an apparatus and improved process for crosslinking a polymer film. By "polymer" is meant any compound derived from one or more monomers, including copolymers, terpolymers, etc., and is preferably a polyolefin. The definition of polyolefin, as intended herein, is a polymer assembled from a significant percentage, preferably 50 weight percent or greater, of one or more olefinic monomers Such polymers include, but are not limited to, polyethylene homopolymer (including high density, low density, and linear low density), ethylene-alpha-olefin copolymers, polypropylene homopolymer, propylene-ethylene copolymers, ethylene-vinyl acetate copolymers, ethylene-methacrylic acid copolymers and their salts, ethylene-styrene polymers, blends of such polymers, and so on. The polymers may be produced by any means, including free radical polymerization (e.g. peroxy compounds), metallocene catalysis, coordination catalysis (e.g., Ziegler or Natta catalysts or variation thereof), or other technologies. Linear low density polyethylene ("LLDPE") is most preferred.

As per the ASTM definition, by "film" is meant any plastics sheeting 0.01 inches (10 mils or 0.254 mm) or less in thickness. The polymer film is preferably a thin film, having a thickness ranging from about 0.00016 inches (0.16 mils or 0.00406 mm) to about 0.007 inches (7.0 mils or 0.178 mm). Polyolefin packaging films are of special interest, specifically stretch and heat shrink films comprising polymers of ethylene. The ethylene polymer is preferably of the linear low-density type ("LLDPE"). The LLDPE films useful in this invention are typically 4 to 150 microns in thickness, with a thickness of 8 to 40 microns preferred.

Figure 1:
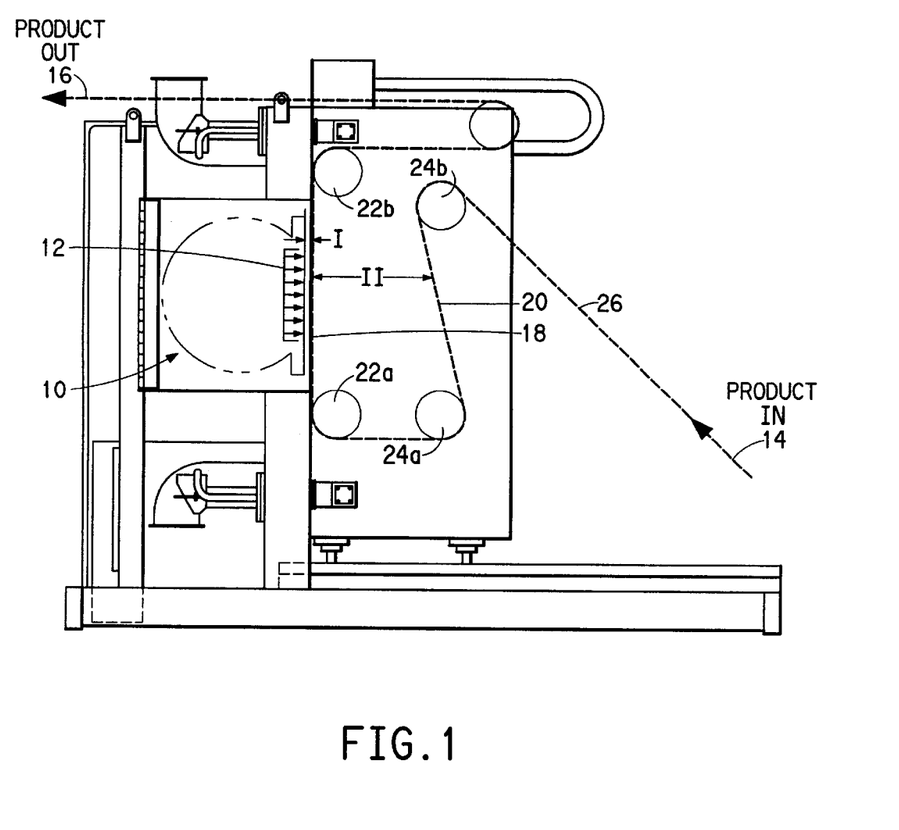
FIG. 1 is a schematic drawing of one embodiment of an apparatus and process for crosslinking a polymer film as claimed.
Figure 2:
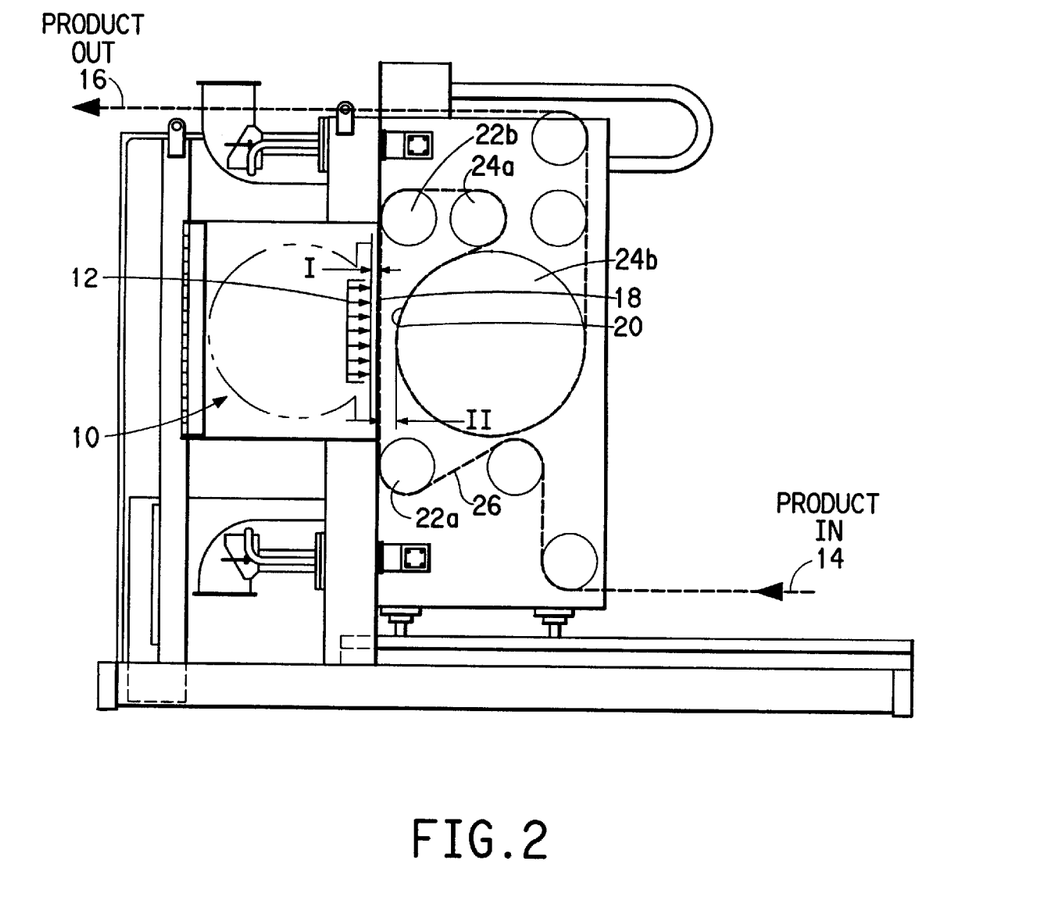
FIG. 2 is a schematic drawing of a preferred embodiment of an apparatus and process for crosslinking a polymer film as claimed.

Reference will now be made in detail to the present preferred embodiments of the invention as illustrated in the accompanying drawings. Wherever possible, the same reference number will be used throughout the drawings to refer to the same or like parts. FIGS. 1 and 2 depict preferred embodiments of the claimed invention.

The apparatus comprises a means for irradiating the polymer film at a level of 500 kV or less. By "means for irradiating" is meant any means for supplying a stream of high energy electrons which can effect the desirable mutation, i.e. crosslinking, of the polymer as it passes through the stream. This includes cathode ray generators, as used in electron beam processors, as well as other sources of electron production including X-ray generators, radioactive materials, such as cobalt 60 source of gamma radiation etc. Sources of high energy electrons or cathode ray radiation is preferred. As shown in the drawings, an electron beam processor 10 is most preferred. The electron beam processor is preferably self-shielded. The means for irradiating the polymer film has an emissions window 12. The radiation passes from the means for irradiating, e.g. the electron beam processor 10, through the emissions window 12 in order to treat the film 26.

Per the invention, the means for irradiating the polymer film operates at a level of 500 kV or below, preferably less than 300 kV. Most multi-pass irradiation systems in the past have required high voltages, typically higher than 750 kV. Lower voltage multi-pass systems have been avoided for various reasons. The transmission loss in the air gaps between passes has been a significant obstacle. Bigger air gaps also allow for more dispersion at the edges of the electron beam processor emissions window, which reduces the uniformity of the irradiation treatment. Applicants have found that if small air gaps are not maintained, the emissions window must be enlarged which is costly and more expensive to maintain. Additionally, the speed limitations of auxiliary equipment (i.e. film conveyance equipment) have made it difficult to move film at higher speeds in a controlled fashion without tensions problems, such as tracking, which is made even more difficult when small air gaps are required. Applicants have addressed this problem by ensuring that the air gaps between passes, and from the emissions window to the first pass, each be less than about 5 inches, preferably less than that, while still maintaining good tension control at high speeds.

It should be noted that in FIG. 1, the film 26 travels in a direction from the film input 14 to the film output 16, but the direction could be easily reversed without any significant impact on the results. The same is true for the apparatus illustrated in FIG. 2. The dose of irradiation that the film receives is the same. For the film paths shown in the drawings, the dose that the product receives can be calculated by the formula:

$$D = (KI/W) 1 S$$

wherein

D=dose or level of irradiation absorbed by the film (typically measured in megarads)

K=a production constant based upon the configuration of the machine

I=beam current of the machine (amps)

W=beam width of the machine (feet)

S=speed or rate the material being irradiated passes through the apparatus (feet per minute)

For thin films, it is expected that the electrons can fully penetrate one layer of material. Considering the two pass embodiments shown in FIGS. 1 and 2, the theoretical dose absorbed by the film would be increased by a full factor of 2. (The actual multiplier will be less due to irradiation power loss in the air gaps and through the films, as well as scattering.)

Per the equation above, for a given set of parameters (production constant K, beam current I, and beam width W), the speed is entirely dependent on the dose level required. Thus, an important benefit of the claimed invention is that the speed of the film could be increased by a factor approaching 2 to give the same required dosage. Alternatively, or in combination with a film speed increase, the current could also be decreased. Either way, significant savings can result.

The invention further comprises a first means for passing the polymer film adjacent to the emissions window 12 for a first-pass film irradiation treatment. (As shown in the drawings, this pass is sequentially the second irradiation treatment of the film. However it is the "first pass" in relation to distance from the electron beam processor 10.) The distance between the emissions window 12 and the first-pass film 18 defines a first air gap 1. This air gap should be less than about 5 inches, preferably less than about 3 inches, and more preferably less than about 2 inches. It is anticipated that distances of about 1 inch or less would be even more preferred, though practically more difficult to achieve.

In FIGS. 1 and 2, rollers 22*a* and 22*b* illustrate one embodiment of the first means for passing the polymer film adjacent to the emissions window b. Other embodiments will be apparent to those skilled in the art.

The invention also comprises a second and n additional means for passing the polymer film adjacent to the first pass film 18 and opposite the emission window 12. The number of additional means, n, may of course be zero (as shown in FIGS. 1 and 2) or greater. The total number of additional means chosen is practically limited due to the loss in effectiveness of the high energy radiation the further the means for passing the polymer film is from the emissions window 12, as well as the loss in uniformity due to dispersion of the electron beam at the edges of the emissions window.

In FIG. 1, rollers 24a and 24b depict one embodiment of the second means for passing the polymer film. FIG. 2 illustrates a preferred embodiment wherein one roll, specifically a chill roll 24b, is used as one of the rolls for the second means for passing the polymer film. The chill roll is helpful in stabilizing the polymer web, i.e. film, at high film speeds to maintain good tension control, thereby allowing for smaller air gaps.

The distance between the first-pass film and the second-pass film defines a second air gap II. This second air gap II should be no more than about 5 inches, preferably no more than about 3 inches, and most preferably no more than about 2 inches. As for the first air gap I, distances of about 1 inch or less may be even more preferred, though practically more difficult to achieve.

Referring to FIGS. 1 and 2, the second air gap may vary in distance along the length of the second-pass film that is opposite the emissions window. Practically, then, the second air gap may be measured as the average distance between the first-pass film and the second-pass film within the area of the window.

The distance between each additional means for passing the polymer film and the previous pass defines a corresponding air gap which should also be average less than about 5 inches, preferably about 3 inches, and most preferably no more than about 2 inches.

FIGS. 1 and 2 depict a single layer of film passing through the apparatus. It is anticipated that each pass of the film, 18 and 20, from the film input 14 through the film output 16, could comprise at least two layers of film, i.e. two-ply or more, adjacent and in contact with each other. This embodiment would further increase the capacity of the apparatus and would be a most preferred embodiment.

The foregoing discussion of the apparatus of the invention herein also applies to the second embodiment of the invention herein. The invention further provides an improved process for crosslinking a polymer film. The process comprises treating the polymer film with electron irradiation to cause crosslinking, wherein the improvement comprises irradiating the polymer film at a level of 500 kV or less, preferably less than 300 kV, in at least two steps. Preferred embodiments of the two steps are depicted in FIGS. 1 and 2.

Step (a) of the improved process comprises passing the polymer film adjacent to an emissions window 12 of an electron irradiation means, preferably an electron beam processor 10. The distance between the emissions window 12 and the film 18 defines a first air gap I. Step (b) comprises passing the film adjacent to the film pass of step (a) and opposite the emissions window for a second treatment of the film. The distance between the film pass 18 of step (a) and the film pass 20 of step (b) defines a second air gap II. Additional passes are possible, wherein the distance between each additional pass and the previous pass defines a corresponding air gap. As discussed above, each air gap is no more than about 5 inches, preferably no more than about 3 inches, and most preferably no more than about 2 inches.

The claimed process encompasses the embodiments wherein the film direction is reversed, i.e. steps (a) and (b) are reversed, such that the film initially passes adjacent to the second air gap, and subsequently passes adjacent to the emissions window and first air gap. The direction is truly irrelevant since the total amount of dose to the film will be the same.

For both the claimed process and apparatus, the film speed will preferably range from about 500 ft/min to about 2000 ft/min, more preferably from about 800 ft/min to about 1500 ft/min, and most preferably about 1000 ft/min to about 1500 ft/min.

Additional advantages and modifications will readily occur to those skilled in the art. The invention in its broader aspects, therefore, is not limited to the specific details, representative apparatus and illustrative examples shown and described. Accordingly, departures may be made from such details without departing from the spirit or scope of the general inventive concept as defined by the appended claims and their equivalents.

EXAMPLES

In order to theoretically determine the feasibility of the double pass concept, a Monte Carlo computer simulation was run. As background, the Monte Carlo program began its development in 1944 and is named based on its simple random number generator. The program was adapted to determine the probable path of electrons accelerated in a vacuum and discharged to the atmosphere. One version of such a program can be obtained from Oak Ridge National Laboratory's Radiation Safety Information Computational Center division in Oak Ridge Tennessee. The package is called the Integrated Tiger Series 3.0.

In the analysis, three questions were answered:

1. What would the K factor be with varying air gaps between the window and film and the two layers of film with given levels of voltage, as compared to the K factor for a single pass system?

2. What is the corresponding dose drop (depth of dose) as it passes through the film and air?

3. What would the uniformity of dose be toward the edges of the window?

Item no. 1 is addressed in Table 1. Table 1 shows the calculated value of the K factor with single and double pass. This particular example shows that the value nearly doubles from 20.9 to 40.4 when the air gaps are kept at one inch. This value was found to drop to 33.6 when two inch air gaps are introduced.

Figure 3:
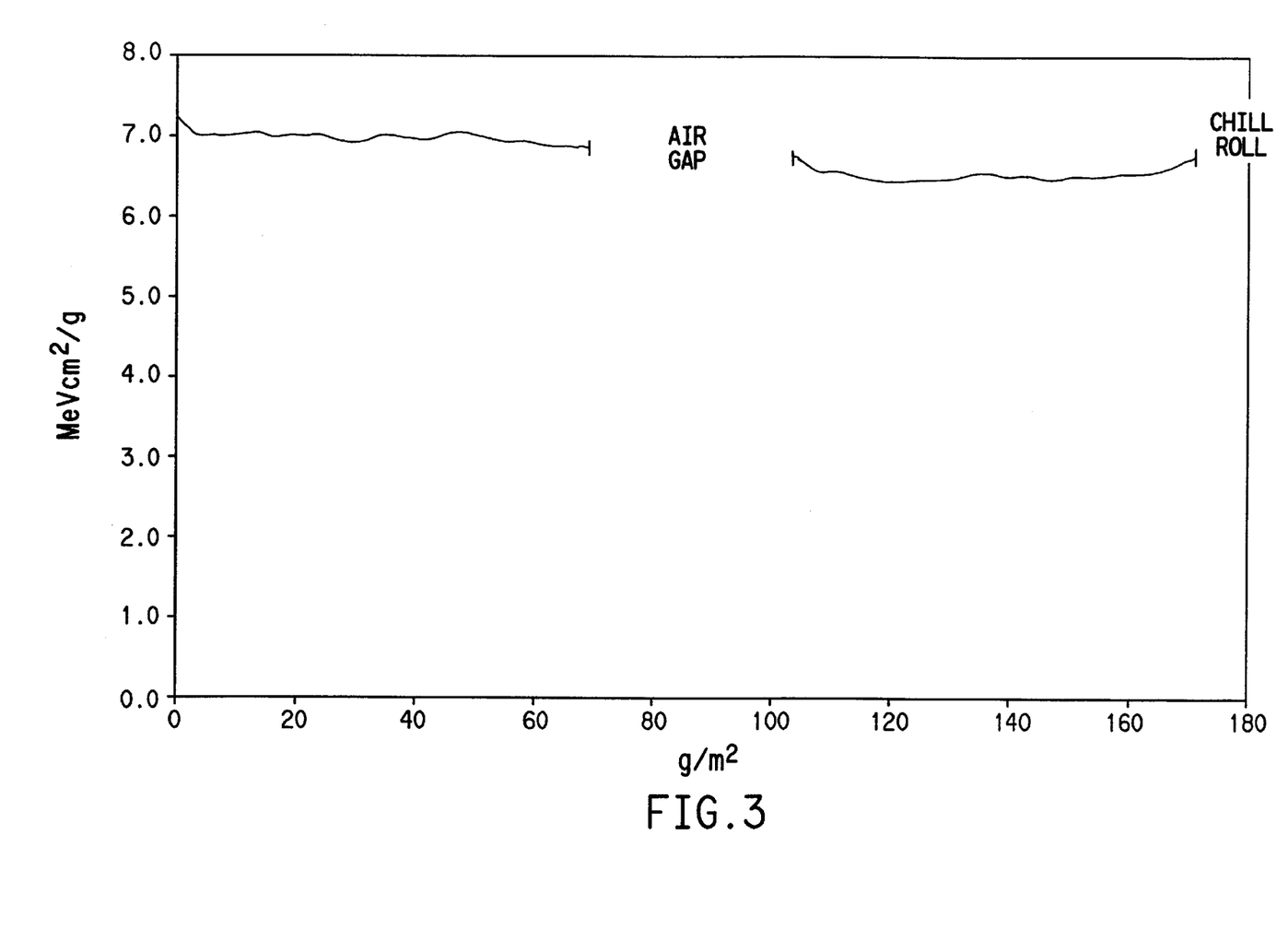
FIG. 3 is a graph illustrating the results of a Monte Carlo computer simulation showing the level of the irradiation through two layers of film and a one inch air gap.

Item no. 2 has been addressed in FIG. 3. It shows that the integrity of the dose is maintained through the first layer of film (0 to 68 g/m$^2$), the air gap, and the last layer of film (102 to 172 g/m$^2$). If 2 inch gaps are used, the deposition value was found to drop from 7 MeV-cm$^2$/g to 4 MeV-cm$^2$/g.

Figure 4:
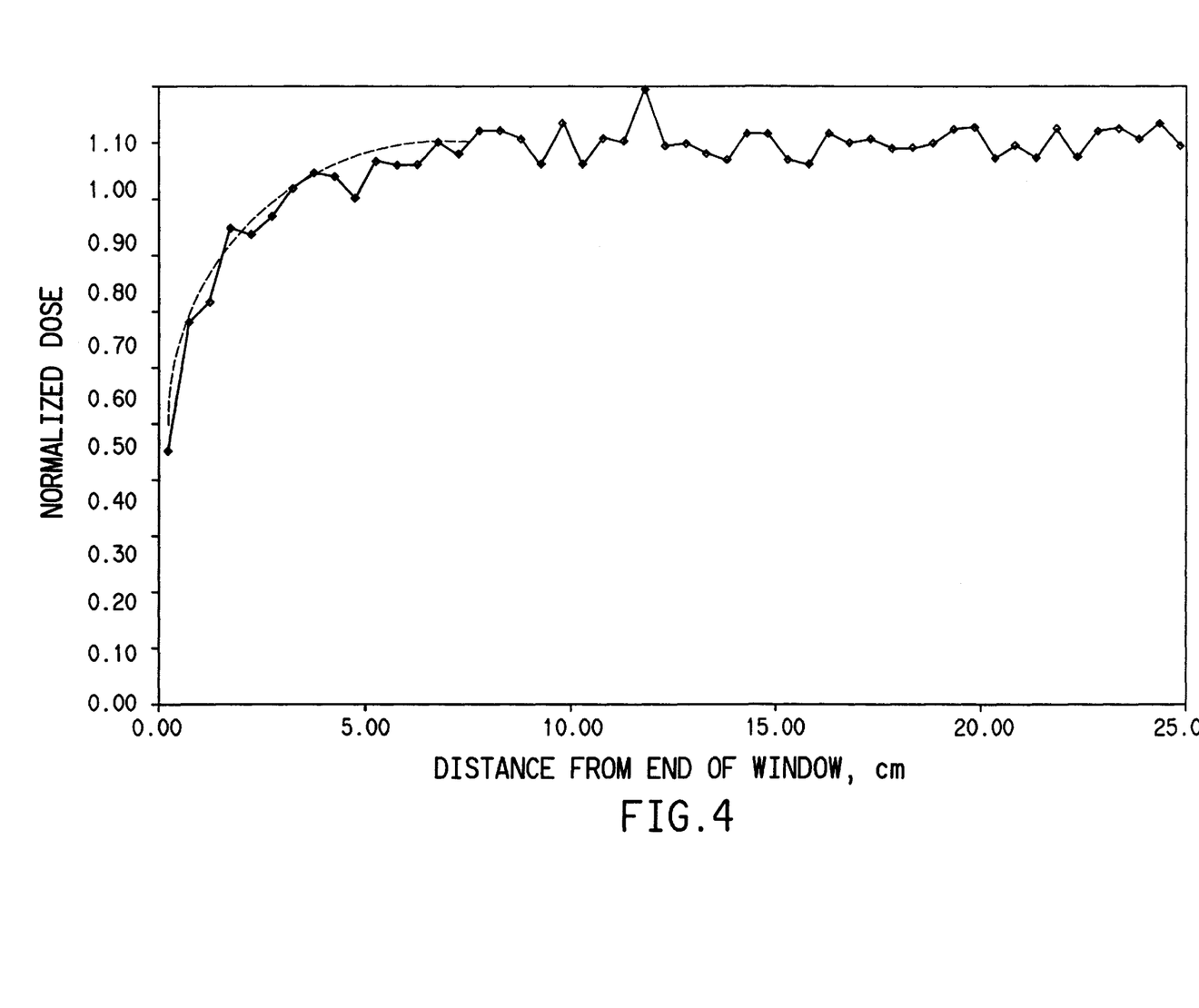
FIG. 4 is a graph illustrating the results of a Monte Carlo computer simulation showing the dose uniformity relative to the distance from the emissions window.

Item no. 3 has been addressed in Tables 2 and 3 and FIG. 4. Table 2 shows the deposition of irradiation using different scenarios. FIG. 4 shows, that using 1.25 inch air gaps, the dose uniformity begins to drop off dramatically at about 4 inches in from the edge of the copper window. This may indicate that the copper window and/or the cathode assembly will need to be made wider to accommodate for the deficiency. Table 3 shows the different scenarios tested and their corresponding location of drop off in dose uniformity.

The air gap was found to be critical to maintain a low kV and the original emissions window width.

TABLE 1

200 kV ELECTRONS IN 0.92 LDPE, WITH 1" AIR GAPS, LDPE200D.OUT

| SZone | Mtl | G/CM$^2$ | | g/cm$^2$ | g/m$^2$ | Vcm | No | 1$^{st}$ Pass | 2$^{nd}$ Pass Reversed | | Sum 1 + 2 | Norm 1 + 2 | 1$^{st}$ Pass Norm |
|---|---|---|---|---|---|---|---|---|---|---|---|---|---|
| 1  | 1 | 0.00E+00 | 6.87E-03 |        |     | 3.68 |    |      |    |      |       |      |      |
| 2  | 2 | 6.87E-03 | 1.01E-02 |        |     | 5.83 |    |      |    |      |       |      |      |
| 3  | 3 | 1.01E-02 | 1.04E-02 | 0.0002 | 2   | 7.23 | 1  | 7.23 | 20 | 6.75 | 13.98 | 1.00 | 1.00 |
| 4  | 3 | 1.04E-02 | 1.08E-02 | 0.0005 | 5   | 7.00 | 2  | 7.00 | 19 | 6.60 | 13.61 | 0.97 | 0.97 |
| 5  | 3 | 1.08E-02 | 1.11E-02 | 0.0009 | 9   | 6.99 | 3  | 6.99 | 18 | 6.53 | 13.52 | 0.97 | 0.97 |
| 6  | 3 | 1.11E-02 | 1.15E-02 | 0.0012 | 12  | 7.00 | 4  | 7.00 | 17 | 6.51 | 13.50 | 0.97 | 0.97 |
| 7  | 3 | 1.15E-02 | 1.18E-02 | 0.0016 | 16  | 7.01 | 5  | 7.01 | 16 | 6.49 | 13.51 | 0.97 | 0.97 |
| 8  | 3 | 1.18E-02 | 1.22E-02 | 0.0019 | 19  | 6.96 | 6  | 6.96 | 15 | 6.46 | 13.42 | 0.96 | 0.96 |
| 9  | 3 | 1.22E-02 | 1.25E-02 | 0.0023 | 23  | 6.98 | 7  | 6.98 | 14 | 6.47 | 13.45 | 0.96 | 0.97 |
| 10 | 3 | 1.25E-02 | 1.29E-02 | 0.0026 | 26  | 6.96 | 8  | 6.96 | 13 | 6.45 | 13.42 | 0.96 | 0.96 |
| 11 | 3 | 1.29E-02 | 1.32E-02 | 0.0030 | 30  | 6.90 | 9  | 6.90 | 12 | 6.50 | 13.40 | 0.96 | 0.95 |
| 12 | 3 | 1.32E-02 | 1.36E-02 | 0.0033 | 33  | 6.91 | 10 | 6.91 | 11 | 6.50 | 13.41 | 0.96 | 0.96 |
| 13 | 3 | 1.36E-02 | 1.39E-02 | 0.0037 | 37  | 6.99 | 11 | 6.99 | 10 | 6.53 | 13.51 | 0.97 | 0.97 |
| 14 | 3 | 1.39E-02 | 1.43E-02 | 0.0040 | 40  | 6.97 | 12 | 6.97 | 9  | 6.50 | 13.46 | 0.96 | 0.96 |
| 15 | 3 | 1.43E-02 | 1.46E-02 | 0.0044 | 44  | 6.94 | 13 | 6.94 | 8  | 6.47 | 13.41 | 0.96 | 0.96 |
| 16 | 3 | 1.46E-02 | 1.50E-02 | 0.0047 | 47  | 6.99 | 14 | 6.99 | 7  | 6.46 | 13.44 | 0.96 | 0.97 |
| 17 | 3 | 1.50E-02 | 1.53E-02 | 0.0051 | 51  | 6.97 | 15 | 6.97 | 6  | 6.44 | 13.40 | 0.96 | 0.96 |
| 18 | 3 | 1.53E-02 | 1.57E-02 | 0.0054 | 54  | 6.92 | 16 | 6.92 | 5  | 6.44 | 13.36 | 0.96 | 0.96 |
| 19 | 3 | 1.57E-02 | 1.60E-02 | 0.0058 | 58  | 6.93 | 17 | 6.93 | 4  | 6.50 | 13.43 | 0.96 | 0.96 |
| 20 | 3 | 1.60E-02 | 1.64E-02 | 0.0061 | 61  | 6.88 | 18 | 6.88 | 3  | 6.53 | 13.42 | 0.96 | 0.95 |
| 21 | 3 | 1.64E-02 | 1.67E-02 | 0.0065 | 65  | 6.87 | 19 | 6.87 | 2  | 6.55 | 13.42 | 0.96 | 0.95 |
| 22 | 3 | 1.67E-02 | 1.71E-02 | 0.0068 | 68  | 6.85 | 20 | 6.85 | 1  | 6.72 | 13.57 | 0.97 | 0.95 |
| 23 | 2 | 1.71E-02 | 2.02E-02 | 0.0100 | 100 | Pass Avge's | | 6.96 | | 6.52 | 13.48 | | |
| 24 | 3 | 2.02E-02 | 2.06E-02 | 0.0104 | 104 | 6.72 | 1  | 6.72 |    |      |       |      |      |
| 25 | 3 | 2.06E-02 | 2.09E-02 | 0.0107 | 107 | 6.55 | 2  | 6.55 |    | Est kGy m$^2$/mA min: | | | |
| 26 | 3 | 2.09E-02 | 2.13E-02 | 0.0111 | 111 | 6.53 | 3  | 6.53 |    | Pass | | 1$^{st}$ | 1 + 2 |
| 27 | 3 | 2.13E-02 | 2.16E-02 | 0.0114 | 114 | 6.50 | 4  | 6.50 |    | MeVcm$^2$/g = | | 6.96 | 13.48 |
| 28 | 3 | 2.16E-02 | 2.20E-02 | 0.0118 | 118 | 6.44 | 5  | 6.44 |    | Times = | | 6.00 | 6.00 |
| 29 | 3 | 2.20E-02 | 2.23E-02 | 0.0121 | 121 | 6.44 | 6  | 6.44 |    |      |       | 41.77 | 80.90 |
| 30 | 3 | 2.23E-02 | 2.27E-02 | 0.0125 | 125 | 6.46 | 7  | 6.46 |    | Efficiency | | 0.50 | 0.50 |
| 31 | 3 | 2.27E-02 | 2.30E-02 | 0.0128 | 128 | 6.47 | 8  | 6.47 |    | K = | | 20.9 | 40.4 |
| 32 | 3 | 2.30E-02 | 2.34E-02 | 0.0132 | 132 | 6.50 | 9  | 6.50 |    |      |       |      |      |
| 33 | 3 | 2.34E-02 | 2.37E-02 | 0.0135 | 135 | 6.53 | 10 | 6.53 |    |      |       |      |      |
| 34 | 3 | 2.37E-02 | 2.41E-02 | 0.0139 | 139 | 6.50 | 11 | 6.50 |    |      |       |      |      |
| 35 | 3 | 2.41E-02 | 2.44E-02 | 0.0142 | 142 | 6.50 | 12 | 6.50 |    |      |       |      |      |
| 36 | 3 | 2.44E-02 | 2.48E-02 | 0.0146 | 146 | 6.45 | 13 | 6.45 |    |      |       |      |      |
| 37 | 3 | 2.48E-02 | 2.51E-02 | 0.0149 | 149 | 6.47 | 14 | 6.47 |    |      |       |      |      |
| 38 | 3 | 2.51E-02 | 2.55E-02 | 0.0153 | 153 | 6.46 | 15 | 6.46 |    |      |       |      |      |
| 39 | 3 | 2.55E-02 | 2.58E-02 | 0.0156 | 156 | 6.49 | 16 | 6.49 |    |      |       |      |      |
| 40 | 3 | 2.58E-02 | 2.62E-02 | 0.0160 | 160 | 6.51 | 17 | 6.51 |    |      |       |      |      |
| 41 | 3 | 2.62E-02 | 2.65E-02 | 0.0163 | 163 | 6.53 | 18 | 6.53 |    |      |       |      |      |
| 42 | 3 | 2.65E-02 | 2.69E-02 | 0.0167 | 167 | 6.60 | 19 | 6.60 |    |      |       |      |      |
| 43 | 3 | 2.69E-02 | 2.72E-02 | 0.0170 | 170 | 6.75 | 20 | 6.75 |    |      |       |      |      |
| 44 | 4 | 2.72E-02 | 8.13E-01 | 0.8030 |     | 0.04 |    |      |    |      |       |      |      |

TABLE 2

DEPOSITION IN 3 MIL LDPE - 2 PASS COMPARED TO 1 PASS

| | | | | 3D Monte Carlo | | 1D Monte Carlo | | |
|---|---|---|---|---|---|---|---|---|
| | | Gap | MeV | MeVcm$^2$/g | ITS K | MeVcm$^2$/g | *ITS K | **Kp |
| 1 Pass | 36" C.R. | 1.25 | 3.350E-03 | 8.638 | 51.83 | | | 21.4 |
| 2 Pass | 36" C.R. | 1.00 | 2.552E-03 | 6.580 | 39.48 | 6.520 | 39.12 | |
|        | Str Thur | 1.00 | 2.925E-03 | 7.542 | 45.25 | 6.962 | 41.77 | |
|        | Total    | 2.00 | 5.477E-03 | 14.122 | 84.73 | 13.483 | 80.90 | 35.0 |
|        | Ratio to 1 Pass | | | | 1.63 | | 1.56 | 1.63 |
| 2 Pass | 36" C.R. | 2.00 | 1.702E-03 | 4.389 | 26.33 | 4.389 | 26.33 | |
|        | Str Thru | 2.00 | 2.799E-03 | 7.217 | 43.30 | 6.880 | 40.80 | |
|        | Total    | 4.00 | 4.501E-03 | 11.606 | 69.63 | 11.169 | 67.13 | 28.8 |
|        | Ratio to 1 Pass | | | | 1.34 | | 1.30 | 1.34 |

3D Parameters

| Dimension | | Source | LDPE |
|---|---|---|---|
| rho | g/cc | | 0.92 |
| thickness | cm | | .00762 |
| Length | cm | | 20.0 |
| Width | cm | | |

TABLE 2-continued

| Exp width | cm     |       | 22.86  |
|-----------|--------|-------|--------|
| Radius    | cm     | 51.29 |        |
| Area      | cm²    | 8264  |        |
| Exp Area  | cm²    |       | 457    |
| Mass      | g      |       | 3.205  |

*ITSK = kGym²/mAmin
As computed in LDPE, (100% transmission)
**Kp = MRf²/mAmin
As expected in FW 60 dosimetry (isolated from back scatter)

TABLE 3

DP8 - 2 PASS COMPUTATION LIST

| File out | Histories | Case | Air Gap | Computation | " to 100% |
|----------|-----------|------|---------|-------------|-----------|
| dp8200aa | 100,000   | 36" C.R. | 4 inches | Profile on Chill Roll | |
| dp8200ba | 1,500,000 | 36" C.R. | 4 inches | Profile on Chill Roll | 5.5 |
| dp8200ca | 1,500,000 | 36" C.R. | 2 inches | Profile on Chill Roll | 3.0 |
| dp8200da | 2,000,000 | 2 Pass | 2 + 2 inches | K, 3 mil LDPB | |
| dp8200ea | 2,300,000 | 2 Pass | 1 + 1 inches | Profile on St Thru & C.R. | In Process |
| dp8200fa | 1,500,000 | 2 Pass | 2 + 2 inches | Profile on St. Thru LDPE | |
| dp8200ga | 2,000,000 | 2 Pass | 1 + 1 inches | K, 3 mil LDPE | |
| dp8200ha | 1,500,000 | 36" C.R. | 1.25 inches | Profile on Chill Roll | 2.0 |
| dp8200ia | 1,500,000 | 36" C.R. | 1.25 inches | K, 3 mil LDPE | |
| p8200jh  | 2,500,000 | 24" C.R. | 4 inches | Profile on Chill Roll | In Process |
| dp820ka  | 1,500,000 | 24" C.R. | 4 inches | K, 3 mil LDPE | In Process |

What is claimed is:

1. An apparatus adapted for crosslinking a polymer film comprising:
   a. a means for irradiating the polymer film at a level of 500 kV or less, such means having an emissions window;
   b. a first means for passing the polymer film adjacent to the emissions window for a first-pass film irradiation treatment, wherein the distance between the emissions window and the first-pass film defines a first air gap; and
   c. a second and n additional means for passing the polymer film adjacent to the first pass film and opposite the emissions window for a second-pass and n additional-pass film irradiation treatments, where n≧0; wherein the polymer film travels in a direction from the first means to the second means for passing the polymer film, and wherein the distance between the first-pass film and the second-pass film defines a second air gap, and each distance between each additional pass and the previous pass thereafter defines a corresponding air gap, each of the air gaps being no more than about 5 inches.

2. The apparatus of claim 1 wherein the first and second air gap are each no more than about 3 inches.

3. The apparatus of claim 1 wherein the speed of the polymer film ranges from about 500 ft/min to about 2000 ft/min.

4. The apparatus of claim 1 wherein the speed of the polymer film ranges from about 800 ft/min to about 1500 ft/min.

5. The apparatus of claim 1 wherein the polymeric film is selected from the group consisting of: low density polyethylene, ultra-low density polyethylene, linear-low density polyethylene, high density polyethylene, and combinations thereof.

6. The apparatus of claim 1 wherein the first means for passing the polymer film adjacent to the emissions window comprises one or more rollers.

7. The apparatus of claim 1 wherein the second means for passing the polymer film adjacent to the first-pass film comprises a chill roll.

8. The apparatus of claim 1 wherein the means for irradiating comprises a self-shielded electron beam processor.

9. The apparatus of claim 1 wherein each the first and second air gap are each no more than about 3 inches, the speed of the polymer film ranges from about 800 ft/min to about 1500 ft/min, the thickness of the polymer film ranges from about 0.00016 inches to about 0.007 inches, the polymeric film comprises a polyolefin, the first means for passing the polymer film adjacent to the emissions window comprises a chill roll, the second means for passing the polymer film adjacent to the emissions window comprises one or more rollers, and the means for irradiating the polymer film is a self-shielded electron beam processor.

10. An improved process for crosslinking a polymer film comprising treating the polymer film with electron irradiation to cause cross-linking, wherein the improvement comprises irradiating the polymer film at a level of 500 kV or less, in at least two steps, comprising
   (a) passing the polymer film adjacent to an emissions window of an electron irradiation means, wherein the distance between the emissions window and the film defines a first air gap; and
   (b) passing the film adjacent to the film pass of step (a) and opposite the emissions window for a second treatment of the film, wherein the distance between the film pass of step (a) and the film pass of step (b) defines a second air gap; and optionally
   (c) passing the film adjacent to the film pass of step (b) and opposite the emissions window for additional pass treatments of the film, wherein the distance between each additional pass and the previous pass defines a corresponding air gap,
   such that each air gap is no more than about 5 inches.

11. The process of claim 10 wherein steps (a) and (b) are reversed, such that the film initially passes adjacent to the second air gap, and subsequently passes adjacent to the emissions window and first air gap.

12. The process of claim 11 wherein the first and second air gaps are each no more than about 3 inches.

13. The process of claim 11 wherein each the first and second air gaps are each no more than about 2 inches.

14. The process of claim 12 wherein the film speed ranges from about 500 to about 2000 ft/min.

15. The process of claim 12 wherein the film thickness ranges from about 0.00016 inches to about 0.007 inches.

16. The process of claim 12 wherein the film comprises at least two layers, adjacent and in contact with each other.

17. The process of claim 12 wherein passing the film adjacent to the film pass of step (a) and opposite the emissions window is accomplished by use of a chill roll.

18. The process of claim 12 wherein the electron irradiation means is a self-shielded electron beam processor.

19. An apparatus adapted for crosslinking a polymer film comprising:
   a. a means for irradiating the polymer film at a level of 500 kV or less, such means having an emissions window;
   b. a first means for passing the polymer film adjacent to the emissions window for a first-pass film irradiation treatment, wherein the distance between the emissions window and the first-pass film defines a first air gap; and
   c. a second and n additional means for passing the polymer film adjacent to the first pass film and opposite the emissions window for a second-pass and n additional-pass film irradiation treatments, where $n \geq 0$;

wherein the polymer film travels in a direction from the second means to the first means for passing the polymer film, and wherein the distance between the first-pass film and the second-pass film defines a second air gap, and each distance between each additional pass and the previous pass thereafter defines a corresponding air gap, each of the air gaps being no more than about 5 inches.

20. The apparatus of claim 19 wherein the first and second air gap are each no more than about 3 inches.

21. The apparatus of claim 19 wherein the speed of the polymer film ranges from about 500 ft/min to about 2000 ft/min.

22. The apparatus of claim 19 wherein each the first and second air gap are each no more than about 3 inches, the speed of the polymer film ranges from about 800 ft/min to about 1500 ft/min, the thickness of the polymer film ranges from about 0.00016 inches to about 0.007 inches, the polymeric film comprises a polyolefin, the second means for passing the polymer film adjacent to the emissions window comprises a chill roll, the first means for passing the polymer film adjacent to the emissions window comprises one or more rollers, and the means for irradiating the polymer film is a self-shielded electron beam processor.

* * * * *